[11] 3,634,628

[72] Inventors Tadahiro Sekimoto
Washington, D.C.;
Ova G. Gabbard, McLean, Va.

[21] Appl. No. 1,985
[22] Filed Jan. 13, 1970
[45] Patented Jan. 11, 1972
[73] Assignee Communications Satellite Corporation
Washington, D.C.
Continuation of application Ser. No. 594,817, Nov. 16, 1966, now abandoned. This application Jan. 13, 1970, Ser. No. 1,985

[54] METHOD AND APPARATUS FOR FORMING TDM SIGNAL BURSTS FOR A TIME DIVISION MULTIPLE ACCESS SATELLITE COMMUNICATION SYSTEM

9 Claims, 4 Drawing Figs.

[52] U.S. Cl. 179/15 BS, 325/4
[51] Int. Cl. H04j 3/16
[50] Field of Search 179/15 BA

[56] References Cited

UNITED STATES PATENTS

| | | | |
|---|---|---|---|
| 2,610,254 | 9/1952 | Deloraine | 179/15 AT |
| 3,306,979 | 2/1967 | Ingram | 179/15 AT |
| 3,418,579 | 12/1968 | Hultberg | 325/4 X |
| 3,447,147 | 5/1969 | Deregnaucourt | 179/15 BA X |

OTHER REFERENCES

" Basic Principles of Varioplex Telegraphy," Philo Holcomb, Jr.; AIEE Paper No. 41- 20, presented at the AIEE Winter Convention; Philadelphia, Pennsylvania, Jan., 1941

*Primary Examiner*—Ralph D. Blakeslee
*Attorney*—Sughrue, Rothwell, Mion, Zinn & Macpeak

ABSTRACT: A method and apparatus by which active information channels are sampled at each station so that information bursts are formed directly by the sampler, thereby eliminating the need for a time-compressing memory to form the bursts. The active channels at each station are sampled at the proper time to reach the satellite in the TDM time slot assigned to the station. The sampling period is the Nyquist period and is equal to the satellite TDM frame time. The sampling period is divided into equal intervals identical in number to the total number of channels in the system so that there is one channel in each interval. Consequently, the burst from the sampler of each station has a burst length or occurs in the period NT where $y$ is the number of active channels at the station, N is the total number of channels in the system, and T is the Nyquist sampling period, which is 125 microseconds for voice intelligence. Channels may be added to a station's transmission burst by activating these channels at the sampler, thereby increasing the length of the burst to accommodate the added channels. The burst length is shortened if channels are dropped.

INVENTORS
T. SEKIMOTO
O. G. GABBARD

BY Sughrue, Rothwell, Mion, Zinn & Macpeak
ATTORNEYS

METHOD AND APPARATUS FOR FORMING TDM SIGNAL BURSTS FOR A TIME DIVISION MULTIPLE ACCESS SATELLITE COMMUNICATION SYSTEM

This is a continuation of application Ser. No. 594,817 now abandoned.

This invention relates generally to an improved method and apparatus for forming time division multiplex (TDM) signal bursts for a plural channel time division multiple access (TDMA) satellite communication system and, more particularly, to a method and apparatus for forming without a time-compressing memory TDM signal bursts which may be varied in length to permit each station to add and drop single or plural channels in accordance with the relative channel demands of all the stations in the system.

This invention may be briefly and broadly summarized as an improved method and apparatus for forming TDM signal bursts in a TDMA communication system in which the time-compressing memory required in the prior proposals is eliminated. Active voice information channels at each station are sampled in this improved method at the Nyquist rate of 8,000 times per second. However, the active channels at each station are sampled sequentially during the period $y/N$ T as previously described, so that the output of the sampler is in burst form. Furthermore, the time at which sampling is initiated is synchronized with a master station reference signal so that the station burst reaches the satellite in its assigned time slot. A burst position synchronizer for turning on the sampler at the correct time is disclosed and claimed in a copending application Ser. No. 594,921 by O. G. Gabbard, entitled Synchronizer for Time Division Multiple Access Satellite Communication System, assigned to the assignee of the present invention.

The PAM sample bursts are converted in a high-speed encoder to PCM bursts and transmitted directly to the satellite without the need for a time-compressing memory which was required in prior proposals. The sampler of each station has the capacity to sample the total number N of channels in the system and single channels may be added or dropped from a given station, thereby increasing or decreasing, respectively, the burst time or time slot assigned to that station within the satellite frame time.

Other objects, features and advantages of the invention will be apparent from the following more particular description of the preferred embodiment of the invention as illustrated the accompanying drawing.

Figure 1:
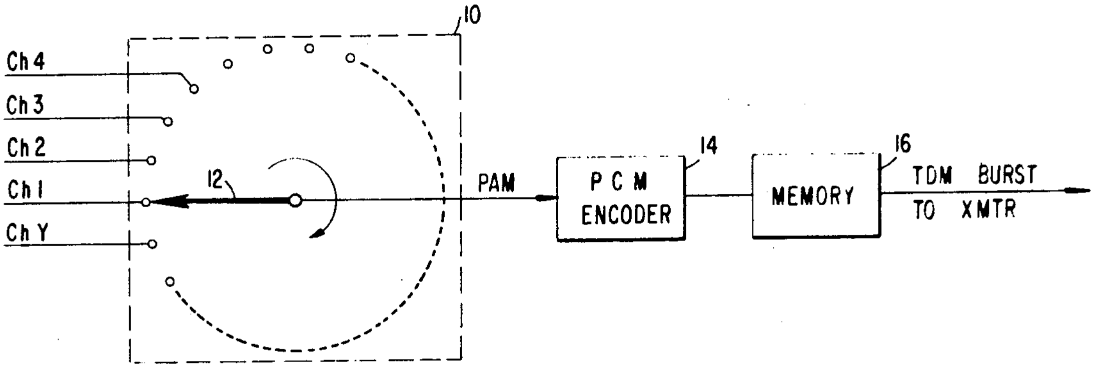
FIG.1 PRIOR ART
FIG. 1 is a block diagram illustrating the manner in which sampling was accomplished in a previously proposed TDMA satellite communication system.

FIG. 1 illustrates a previously proposed sampling method. Let us assume that Y voice channels are assigned to this station. A channel sampler 10, represented schematically by a mechanical commutator 12, scans or samples each of the channels at the Nyquist rate of 8,000 times a second. In other words, commutator 12 rotates at a rate of 8,000 revolutions per second and consequently samples each channel once every 125 microseconds. The samples are equally spaced in time through the entire 125 microsecond Nyquist period. The PAM output from commutator 12 is fed to a low speed encoder 14 which converts the PAM pulses into PCM pulses. The PCM output of the encoder is fed to a time-compressing memory 16 where it is stored for the TDM frame time to permit interleaving of the PCM signals with corresponding signals from the other stations in the system. The memory 16 at each station is read out once every frame time in the form of a TDM burst which is transmitted to reach the satellite in the station's assigned time slot. Another memory (not shown) is also required at each receiving station for expanding the compressed PCM signals prior to decoding. In the previously proposed TDMA system, each time slot or burst time was fixed in length and was on the order of 100 microseconds long. The TDM frame time for a 100 voice channel system was on the order of 10 milliseconds long.

In such a prior art system, not only is a time compressing memory required because of the burst time which is long relative to the Nyquist sampling period of 125 microseconds, but also because of the sampling technique (FIG. 1) in which the channel samples at each station are equally spaced over the entire 125us period. The samples from each sampling period are stored in the memory over the frame time and are compressed by being read out or transmitted in a single burst once each frame time to reach the satellite in the proper time slot.

In this previous method, the time slot or burst time is fixed in length, thereby resulting in great inefficiency in the use of the satellite when some of the channels assigned to a sampler are not needed. The only way in which idle channels can be reassigned to other samplers is to reassign an entire time slot or burst time. Adding individual channels to increase the burst length would have been impractical because of the extremely complex memory which would have been required.

Figures 2, 4:
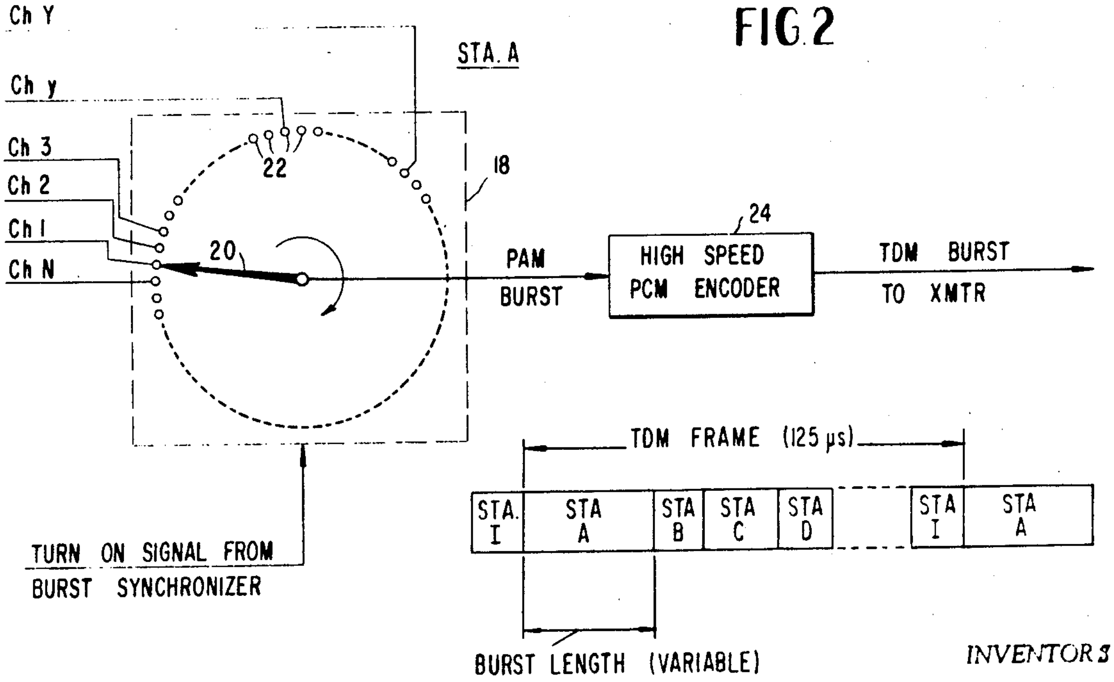
FIG. 2 is a block diagram of a portion of an earth station employing the improved method of forming TDM burst signals.
FIG. 4 is a schematic diagram illustrating a TDM frame including the variable signal burst length obtained by the invention illustrated in FIG. 2.

FIG. 2 illustrates a portion of an earth transmitter station A employing the improved TDM signal burst forming method which permits the elimination of a time-compressing memory and also permits channels to be added and dropped from a station's burst time one channel at a time. Such a result is accomplished broadly by utilizing a sampling method which permits the burst time assigned to each station to be variable in one channel increments rather than fixed as in the prior art systems.

The station includes a sampler 18 represented by a commutator 20 which rotates 8,000 revolutions per second. Let us assume that sampler 20 is equipped with Y channel inputs 22 and there are N channels available in the complete system, where $1\leq Y<N$. Normally only $y$ channels would be active at the station, where $1\leq y\leq Y$, in which case the PAM burst on the output of commutator 20 contains samples from channels 1, 2...$y$. Note that commutator includes N positions all of which are included in each 125 microsecond revolution of the commutator. However, only the active $y$ channels will produce PAM pulses, and these pulses are already in burst form. The active channels are sampled at the Nyquist rate of 8,000 times per second, but the time between the PAM pulses is less than the prior art technique illustrated in FIG. 1. The PAM burst time occupies only $y/N$ of the 125 microsecond period which is chosen as the frame time in the improved method. The output of the sampler is fed to a high-speed PCM encoder 24 which feeds TDM bursts directly to a transmitter (not shown) without the intermediate time compressing memory illustrated in FIG. 1.

When the improved technique of this invention is used, another earth station may have a corresponding sampler equipped with X channels, of the remaining N–Y channels, where X is the maximum number of channels the station ever expects to demand, and $1\leq X<N$. However, $x$ is the normal number of active channels where $1\leq x\leq X$. The station may increase its number ($y$ or $x$) of active channels, thereby increasing its burst length, since burst length is directly proportional to the number of active channels.

Let us assume that the first station with $y$ active channels is assigned the time slot immediately preceding the second station with $x$ active channels. The burst position synchronizer of said copending application functions to place channel 1 of the second station next to channel $y$ in the satellite time frame. If all the channels are not being used and a channel is added to or dropped from a station burst time, the synchronizer positions subsequent bursts so they are contiguous in the satellite. Of course, if the system is already operative at full capacity, one station must drop a channel and shorten its burst before a channel can be added to another station.

The versatility of the improved method can be visualized if one considers a three station system with one station located in Los Angeles, another in Tokyo and another in Hawaii. When it is midday in Los Angeles, it is the middle of the night in Tokyo. Consequently, the demand at this time for channels between Los Angeles and Hawaii would be far greater than for channels between Los Angeles and Tokyo. With the improved method and means illustrated in FIG. 2, idle channels normally assigned to Tokyo can be reassigned to Los Angeles and Hawaii. This result is accomplished by deactivating channel inputs at the Tokyo station sampler and activating the same number of channel inputs at the Los Angeles or Hawaii station samplers. In the earlier proposed system described above, the burst time slot alloted to each earth station had to be fixed thereby resulting in a great waste of satellite time when a station, such as Tokyo, was using less than all of its channels in one burst time slot and another station, such as Los Angeles, had a demand for more than its normal number of active channels. Actual operating TDMA systems will have a larger number of accessing earth stations.

The fact that certain channels are not needed at a particular earth station can easily be communicated to other stations by including this information in a previous transmission. A specific channel of each station in the system may be reserved for this purpose. Alternatively, the assignment of channels may be set up on a time schedule so that during daily periods of low-traffic load at one station, a predetermined number of channels are dropped from the station and added to the transmission burst time of another station having a greater traffic load requiring additional channels.

Figure 3:
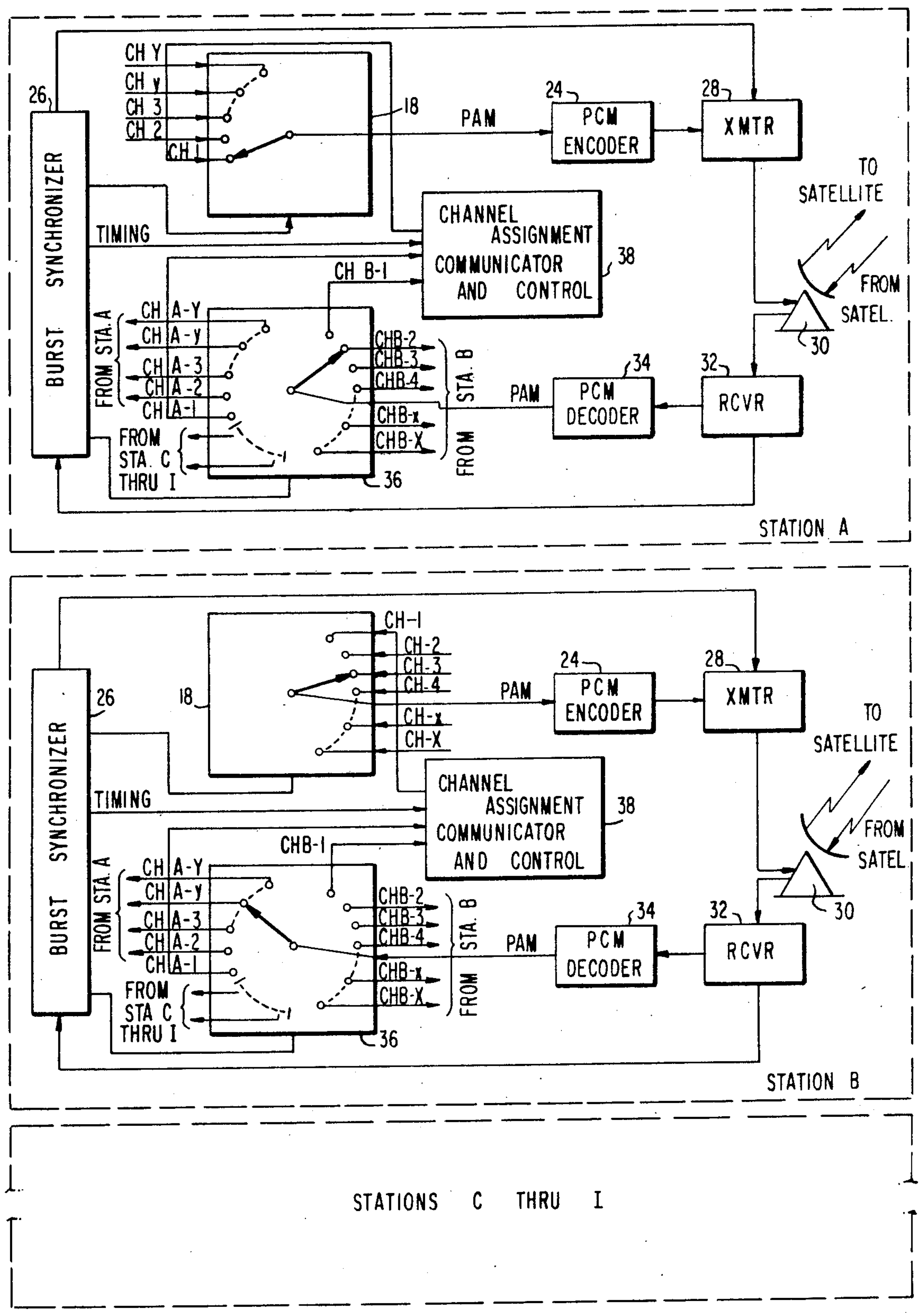
FIG. 3 is a block diagram of a TDMA communication system incorporating the signal burst forming method and apparatus illustrated in FIG. 2.

FIG. 3 illustrates a TDMA satellite communication system incorporating the burst forming method and apparatus illustrated in FIG. 1. Even though only two stations (STATION A and STATION B) are shown, any number (I) may be used in the system.

The transmitting sampler 18 of STATION A has Y normally assigned channels and *y* active channels, while the transmitting sampler 18 of STATION B has X normally assigned channels and *x* active channels. Other stations, C, D...I also have active and normally assigned channels.

Each station in the system also includes a burst synchronizer 26, a high-speed PAM-to-PCM encoder 24, a transmitter 28, an antenna 30, a receiver 32, a high-speed PCM-to-PAM decoder 34, a receiving sampler 36 and a channel assignment communicator and control 38. The function of each burst synchronizer 26 is described above and along with its structure in more detail in the copending application cited above.

The channel assignment communicator and control 38 at each station keeps track and controls the number of active channels at each station and also transmit via channel 1, for example, any change in the channel assignments among the stations.

The output from the receiving samplers 36 may be converted to audio signals by suitable conventional apparatus (not shown) and then applied to a telephone set or telephone analog trunk, for example.

The same reference numerals have been used to identify corresponding components in FIGS. 2 and 3 and also to identify corresponding components in STATIONS A and B in FIG. 3.

FIG. 4 is a diagrammatic illustration of a 125 microsecond TDM time frame showing the manner in which relative lengths of the signal burst from the various stations may be varied as described above.

There has been described above a novel method and apparatus which eliminates the need for a time-compressing memory at each earth station and increases the versatility of a TDMA satellite communication system by permitting satellite TDM channels to be reassigned among the earth stations in order most efficiently to utilize all channels in accordance with the relative demands of the stations.

While the invention has been particularly shown and described with reference to preferred embodiments thereof, it will be understood by those skilled in the art that various changes in form and details may be made therein without departing from the spirit and scope of the invention.

What is claimed is:

1. An improved method of directly forming a time division multiplex (TDM) signal burst at a transmitting station in a time division multiple access (TDMA) communication system including a plurality of transmitting stations and a single relay station wherein said transmitting station has a plurality of channels and normally places a TDM burst in an assigned time slot of a TDM frame at the relay station, said burst containing samples of information from the channels at said transmitting station and said TDM frame containing no more than one burst from each transmitting station, comprising sampling the channels at said station during a time period no longer than said assigned time slot and at a constant rate such that only one sample from each channel is formed during the TDM frame.

2. An improved method of forming a TDM signal burst as defined in claim 1 wherein the channels having information are designated as active channels while the remaining channels are designated as inactive channels comprising sampling only the active channels at said station, whereby the TDM burst length is varied in proportion to the number of active channels at said station.

3. An improved method of forming a TDM signal burst as defined in claim 1 wherein the channels having information are designated as active channels while the remaining channels are designated as inactive channels and only the active channels of said station are sampled and the active channel bursts are pulse amplitude modulated and further comprising encoding said active channel sample bursts into pulse code modulation bursts.

4. An improved method of forming a TDM signal burst as defined in claim 1 further comprising beginning the sampling at said station at the time for initiation of transmission of a burst by said station.

5. An improved method of forming a TDM signal burst as defined in claim 1 further comprising setting said sampling rate of each channel equal to the Nyquist frequency of the information contained in said channels.

6. An improved method of forming a TDM signal burst as defined in claim 4 further comprising setting said sampling rate equal to the Nyquist frequency of the information contained in said active channels.

7. An improved method of forming a TDM signal burst as defined in claim 6 wherein the information is voice, the sampling rate is 8,000 cycles per second, and the TDM frame time is 125 microseconds.

8. An improved method of forming a TDM signal burst as defined in claim 1 comprising varying the burst length to make it proportional to the number of active channels at said station, thereby correspondingly varying the time slot assigned to said station.

9. An improved method of forming a TDM signal burst as defined in claim 1 wherein the active channel bursts are pulse amplitude modulated and further comprising encoding said active channel sample bursts into pulse code modulation bursts.

* * * * *